United States Patent [19]

Adams et al.

[11] 3,958,687

[45] May 25, 1976

[54] HIGH-SPEED MULTI-CHANNEL FEEDER FOR TABLETS

[75] Inventors: Jim Mills Adams, West Caldwell; Gilbert Carl Kaetzel, Wayne, both of N.J.

[73] Assignee: Hoffmann-La Roche Inc., Nutley, N.J.

[22] Filed: Oct. 9, 1974

[21] Appl. No.: 513,353

[52] U.S. Cl. ............................ 198/220 BA; 193/38; 198/287
[51] Int. Cl.² ................. B65G 27/04; B65G 47/12
[58] Field of Search ............. 198/220 BA, 254, 278, 198/281, 282, 283, 287; 221/171, 172, 173; 193/38, 41, 2 B

[56] References Cited
UNITED STATES PATENTS

| 845,415 | 2/1907 | Hicks | 221/172 |
|---|---|---|---|
| 1,278,291 | 9/1918 | Balwick | 198/220 BA |
| 2,159,050 | 5/1939 | Quamma | 198/287 |
| 2,586,586 | 2/1952 | Washburn | 198/281 |
| 2,610,724 | 9/1952 | Dudley | 198/220 BA X |
| 2,744,602 | 5/1956 | Aldred | 193/38 |
| 3,084,782 | 4/1963 | Bower | 221/173 X |
| 3,120,888 | 2/1964 | Piel | 198/289 |
| 3,301,378 | 1/1967 | Wayne | 198/220 BA X |
| 3,439,791 | 4/1969 | Matthews | 198/220 BA X |
| 3,623,594 | 11/1971 | Ravn | 198/287 X |
| 3,670,865 | 6/1972 | Garland | 198/287 |

*Primary Examiner*—Evon C. Blunk
*Assistant Examiner*—James L. Rowland
*Attorney, Agent, or Firm*—Samuel L. Welt; George M. Gould; Mark L. Hopkins

[57] ABSTRACT

Herein is disclosed a feeding arrangement for high-speed multi-channel sensing and counting apparatus utilized in processing randomly-flowing discreet solid particular objects such as pharmaceutical tablets. An inclined vibrating feeder-tray is provided having a receiving and spreading region and a multi-channel sorting region. Each channel of the latter is provided with an exit port at the extreme end thereof for passage of the objects from the tray to an associated channel of a sensing apparatus. Associated with each channel of the feeder-tray is a wedge-like directing means having at least four unique inclined plane surfaces for operating on the objects incoming to the channel, which directing means enables each object to become oriented in the preferred erect orientation of rolling on its cylindrical surface, regardless of the initial orientation thereof upon entering the channel. Additional means are provided for adapting the feeder-tray to various different ranges of sizes of the objects.

61 Claims, 7 Drawing Figures

HIGH-SPEED MULTI-CHANNEL FEEDER FOR TABLETS

CROSS-REFERENCE TO RELATED APPLICATION

This invention is related to the subject matter of commonly-assigned U.S. Pat. No. 3,760,166.

BACKGROUND OF THE INVENTION

The present invention relates to an improved feeding, sensing and counting system particularly adapted to count with a low degree of error (0.0001) a high rate of randomly-flowing discreet, solid particular material. In particular, the system incorporating the present invention is adapted to count solid objects such as pharmaceutical tablets. Whereas commonly assigned U.S. Pat. No. 3,760,166 is essentially concerned with the sensing and counting techniques of such a system, the instant invention is principally directed to the feeding aspects of this technology.

High-speed feeding and counting of large numbers of discreet, solid particular objects have long presented a problem of counting accuracy to the art. The basic method utilized in the art for sensing/counting employs a light beam disposed across the path of the object and directed towards a sensing means. Each passage of an object across the light beam results in interruption of the beam causing a unique signal to be produced in the sensing means which is used to trigger an appropriate type of counter.

As higher and higher flow rates are attempted, difficulty is experienced in accurately sensing the objects to be counted due to the inability of the device to separate the objects in the flow streams. For example, when tablets of the type used in the pharmaceutical industry are to be counted and are introduced in free fall through a counting channel at high flow rates (5–10 units per second), the tablets tend to come together with no separation. This results in a situation where a unique signature pulse may not be obtained for each individual tablet. It appears that under these circumstances the probability of erroneous signatures occurring is approximately 0.002. This level is unacceptable under new standards of accountability as to pharmaceutical products, which require a counting error of less than one part in $10^4$.

Of equal importance in the overall process is a feeding mechanism which can keep up with the speeds contemplated for a multi-channel electronic sensing mechanism. It is necessary for such a feeding arrangement to be able to derandomize objects which are usually introduced in a continuous loading mode such as via a high-volume conveyor arrangement, into a preferred discreet orientation for high-speed accurate handling by the sensing mechanism. High-speed, multi-channel sensor/counter arrangements, moreover, usually require that the objects be presented for sensing in single file and in the orientation most suitable for easy passage through the sensing channel and least likely to cause a jam-up. State of the art arrangements do not reveal a unitary feeding mechanism capable of meeting these requirements.

SUMMARY OF THE INVENTION

It is, therefore, a principal object of this invention to provide a high-speed multi-channel unitary feeding mechanism which will meet the interfacing demands of high-speed as well as accurate operation with regard to sensing and counting apparatus for randomly-flowing discreet solid particular objects such as tablets.

According to the broader aspects of the invention, there is provided apparatus for feeding randomly-flowing discreet solid particular objects such as tablets to an ultra-accurate, high-speed sensing and counting arrangement, comprising an inclined vibrating feeder tray having an object receiving and an object sorting region, said sorting region being provided with a plurality of spaced means for defining n substantially parallel channels arranged in the direction of intended object movement, each of said channels having at the remote end thereof an exit port for permitting the objects to pass from said tray to the sensing arrangement, each of said channels having associated therewith directing means for causing the objects entering the channel to become disposed in a predetermined orientation for passage through said exit port, regardless of the orientation thereof upon entering the channel.

Among the many features of the invention is the applicability thereof to a wide range of objects and object sizes, such as coins, washers, and the like. As a part of this, the incline of the feeder tray and the frequency of oscillation thereof are readily adjustable to the size of the objects to be processed, for achieving optimal operation particularly as to maximum flow rate.

Moreover, the feeding operation may be made to be self-protecting by way of the inclusion of feeder jam detection means enabling automatic shut-down of the feeding arrangement in the event of a substantial pile-up in the feeder tray. Also, the tray receiving area and certain sorting region parameters are capable of being varied to optimize operation relative to the size of the objects to be processed.

BRIEF DESCRIPTION OF THE DRAWINGS

The above-mentioned and other objects and features of this invention will become more apparent by reference to the following description taken in conjunction with the accompanying drawings, in which.

DESCRIPTION OF THE PREFERRED EMBODIMENT(S)

This invention is designed particularly for the continuous feeding of uniform-shaped objects in high-speed, ultra-accurate, multi-channel sensing and counting equipments, particularly where it is necessary to present the objects in single file to a sensing mechanism such as an electrooptic cell or similar contrivance.

Figure 1A:
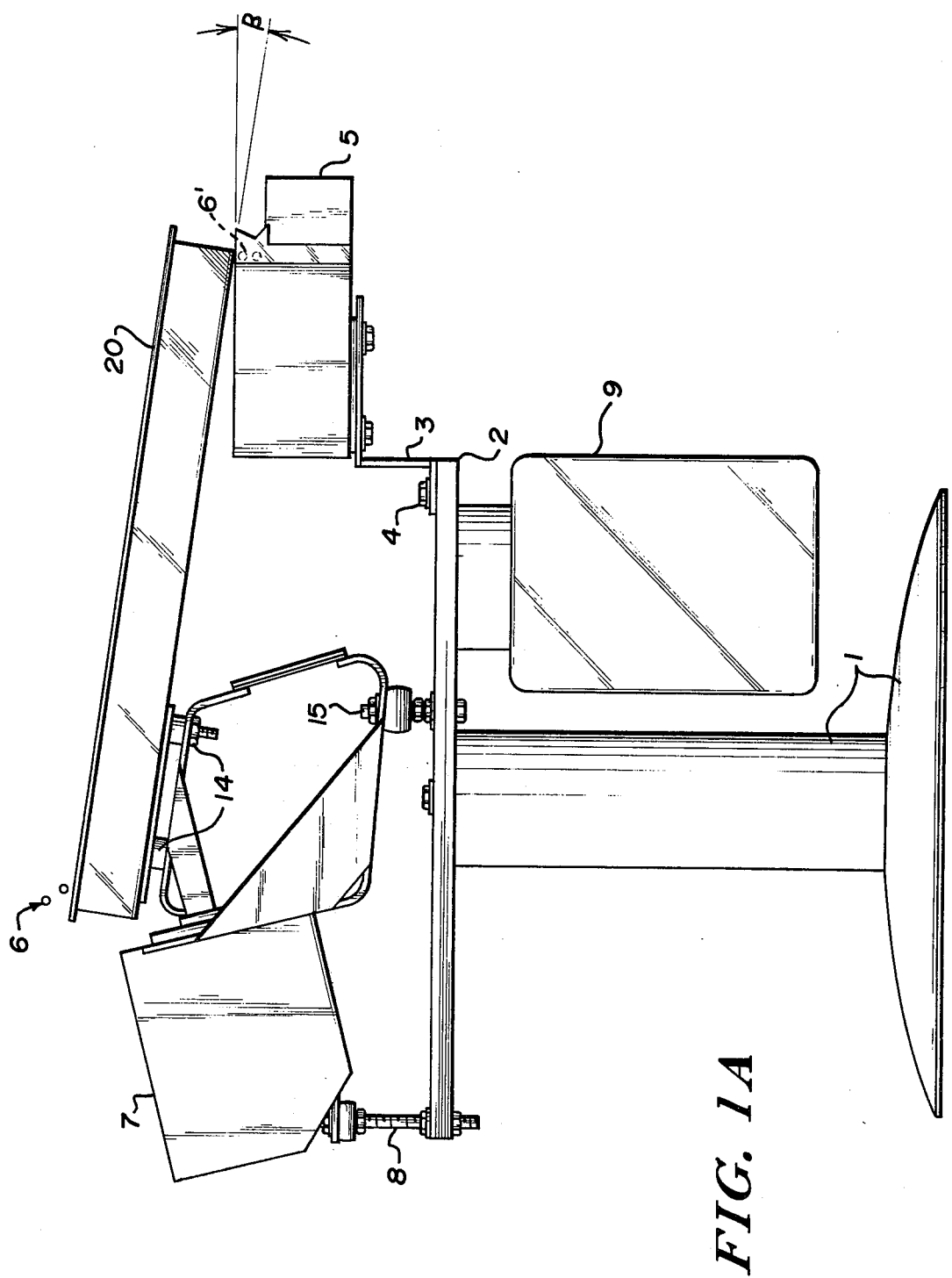
FIGS. 1A–1C are respectively left side, top and front diagrammatic views illustrating in particular a feeding apparatus for high-speed sensing and counting of objects such as tablets.
Figure 1B:
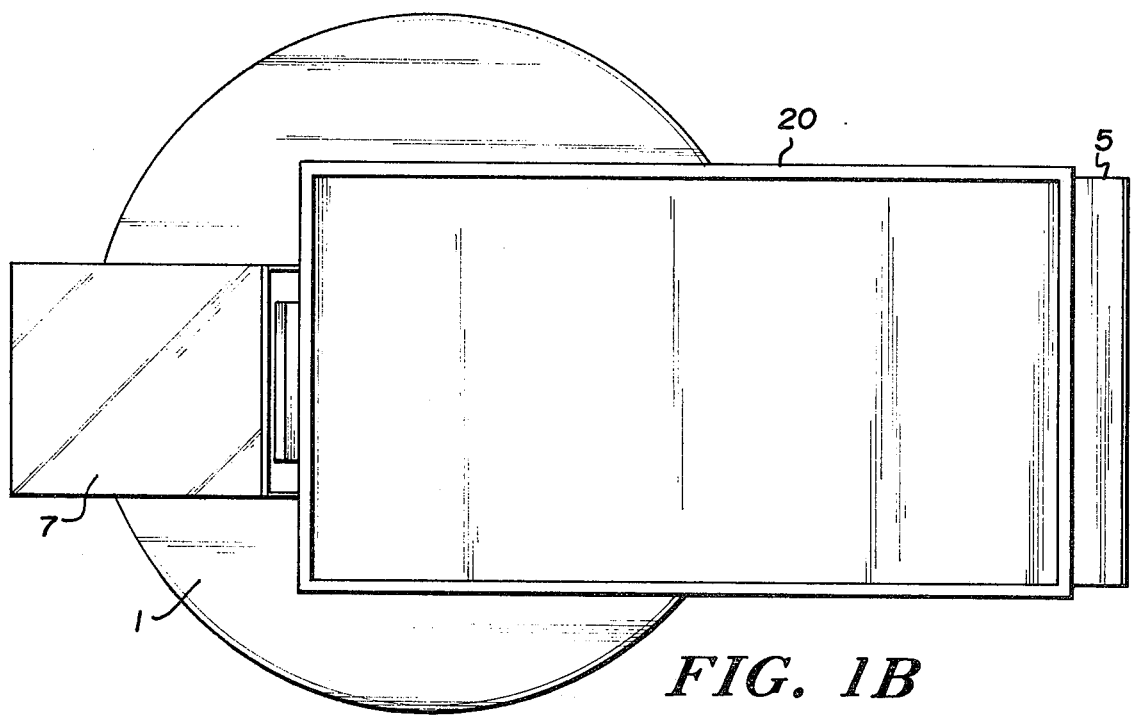
Figure 1C:
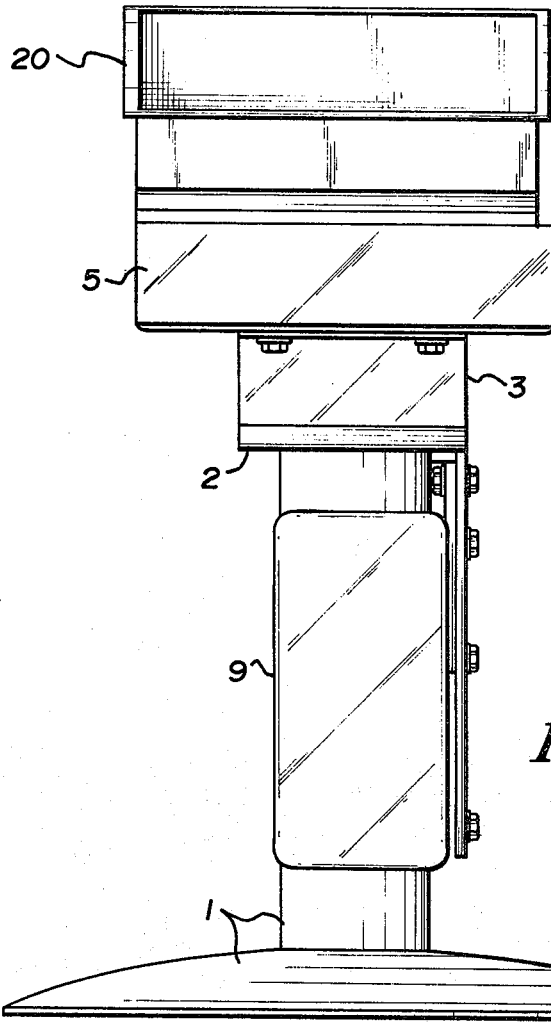

In FIGS. 1A–1C there is illustrated a preferred arrangement for the feeding of objects of predefined shape such as tablets to a high-speed sensing means, which in turn generates for each object sensed a counting pulse that is transmitted by any suitable means (including cables) to a high-speed electronic counting arrangement. For a specific description of an example of such electronic equipment, attention is called to the disclosure in commonly-owned U.S. Pat. No. 3,760,166 which describes an electronic counting arrangement fully capable of handling the counting pulses generated, which disclosure in particular is incorporated herein by reference.

By way of example, the remainder of this disclosure shall make specific reference to tablets as the objects to be processed, and in particular tablets which are substantially cylindrical in shape and having an L/D ratio of less than 1.0, where D is the tablet diameter and L is the axial dimension or thickness of the tablet. While the invention is described herein in reference to such objects and is primarily intended for use with regard to pharmaceutical tablets having such dimensional relationship and shape, it is to be expressly understood that the scope or application of the invention is not to be limited thereto.

In FIGS. 1A–1C a base 1 supports a horizontally arranged mounting member 2 fixedly secured to the base 1 by any suitable means including the bolt arrangement shown. Manually mounted atop member 2 is a sampling or sensing head 5. Sampling head 5 is fixedly secured to mounting member 2 by way of a substantially Z-shaped bracket 3 and suitable holding means such as the bolt arrangement depicted at mounting point 4.

Also mounted to member 2 is a commercially available vibrator assembly comprising a vibrating unit 7 and the control means 9 therefor. While the latter is secured by any suitable means to the lower right side of mounting member 2, the vibrating unit is similarly secured atop the left side portion of mounting member 2 via mounting means 8 and 15.

As may be seen in FIG. 1A, a feeder tray 20 is fixedly secured to vibrating unit 7 to proximate its one end by suitable mounting means such as the bolt arrangement shown at 14. This end of the feeder tray 20 secured to vibrating unit 7 is arranged to be higher than the right end thereof, which is shown to be nearly resting via its bottom end edge upon the sampling head 5. By virtue of the relative positioning of the right side portion of unit 7 and the sensing head 5, the feeder tray is inclined toward the sensing head 5. This incline relative to the horizontal is represented in FIG. 1A by the angle $\beta$, which is adjustable, for example, via means 8 and 15, anywhere within the operating range of 4° to 15°, for optimization of operation based on flow rate. As the principal intention of this invention is, of course, to maximize the flow rate of tablets to the sensing head, $\beta$ is adjusted to achieve this. Flow rate, in turn, however, is dependent upon the largest dimension of the objects to be processed, in the example given the diameter D of the tablets, as well as the L/D ratio thereof. As larger and larger tablets are considered it will be apparent that corresponding lower maximum flow rates are obtainable inherently.

The tablets 6 are introduced into the tray 20 at the upper end thereof preferably in a continuous broad stream by any suitable means (not shown) such as by hand or by a conveyor belt arranged above the upper end of the tray 20. From there the tablets are moved under the influence of the tray's incline and the vibratory action in the tray 20 imparted by unit 7 to the opposite or lower end of the tray whereat they encounter exit ports and are allowed to free fall from the bottom of the tray (at 6') through vertically arranged channels in the sensing head 5. In so doing each tablet generates a separate counting or signature pulse. For a better understanding of the operation of such a multi-channel sampling head 5, the reader is referred to the detailed description contained in the above-referenced commonly-owned U.S. patent. Although the sampling head description contained therein is directed in particular to the sampling or sensing of capsules, as opposed to tablets, the principles of photoelectric sensing and obtaining unique signature for each object passing through the sensing head remain the same. Insofar as the instant sampling head 5 would depart from that disclosed in the referenced patent by virtue of the needs associated with the sensing of a different field of objects, description is contained herein covering such departure.

Essentially, therefore, the principal function provided by this invention is to receive a continuous random flow of tablets and derandomize them into a plurality of channels in a predetermined orientation for feeding in single file to the sensing head at the maximum rate possible. It is to be noted that the invention accepts tablets of any size provided the proper geometrical relationships are retained.

Figure 2:
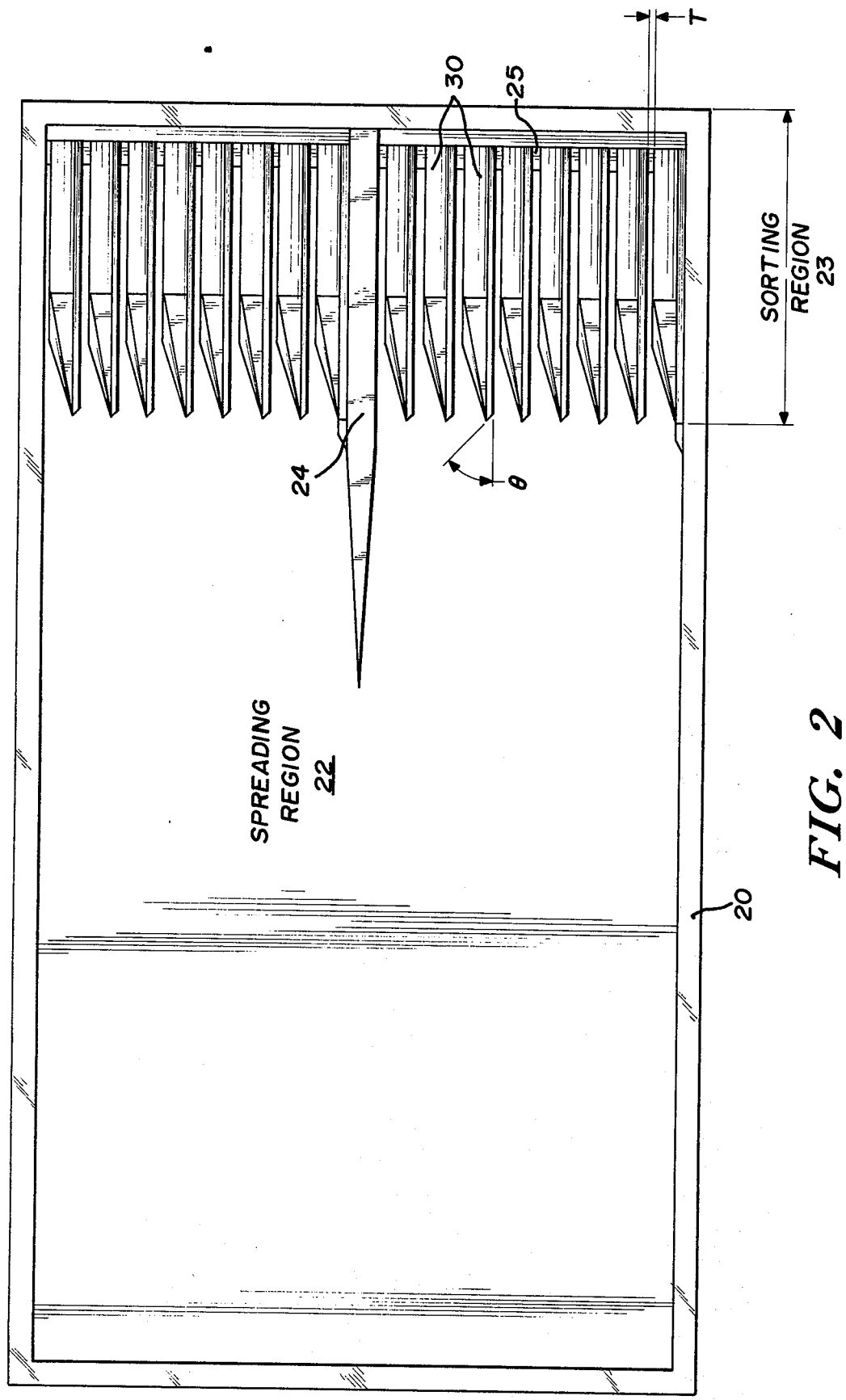
FIG. 2 is an enlarged diagrammatic top view of the feeder tray arrangement of the apparatus depicted in FIGS. 1A–1C according to the invention.

The feeder tray 20 is caused to vibrate or oscillate within the range of 30–60 Hz to drive the tablets from the upper portion, illustrated in FIG. 2 as a receiving and spreading region 22, to the lower portion, which is generally designated as the sorting region 23. As the name implies the spreading region serves to receive the tablets from the conveyor belt and to spread or randomize the received tablets uniformly across the tray bottom before they reach the sorting region. Uniform spreading of objects across the floor of the tray occurs due to the oscillatory motion thereof. The sorting region on the other hand is designed to derandomize the tablets, i.e., to channel the tablets into a plurality of channels wherein the tablets are influenced to the extent that, regardless of their initial orientation when entering the channels, the tablets take on a predetermined orientation and progress down the channels in single file toward the respective exit ports. The predetermined orientation contemplated here is for the tablets to be upright, i.e., erect, on their edge or cylindrical surface and rolling along thereon, since this represents the mode of stable rapid motion of cylindrical objects on an incline. The frequency of oscillation of the tray is adjustable via control 9. Adjustment of the oscillation frequency and amplitude can be used to optimize the operation of the tray. For example, it has been shown to be preferable to select as the operating frequency the resonant frequency of the tray 20. Moreover, small variations in frequency can be made to accommodate different sized tablets to be processed. In line with this, for larger sized tablets, the receiving and spreading area of the feeder tray may be adapted to be enlarged somewhat by extending the length thereof via any suitable means such as a telescoping tray arrangement.

The sorting section 23 is comprised of a plurality of parallel channels (FIG. 2) extending in the direction of intended tablet movement (16 channels are shown), each one of the channels terminating at the extreme lower end of the tray 20 with an exit port 25 opening through the floor of the tray.

The sorting section is conveniently divided into left side and right side channel groups by means of a wedge-shaped flow distributor 24 which extends from the lower end of the tray 20 into the upper region 22 of the tray. The flow distributor having a length about twice that of the wedges represents a convenient means for directing the tablets to either side of the tray sorting region following their entrance into the tray in random fashion. The flow distributor 24 may be a single sided or double sided wedge (as shown). The tablets 6, in sliding along the floor of the tray 20, are divided by the flow distributor 24 into the two groups which eventually encounter the entrance of the sorting region. The tablets reach this point in many different orientations, as there have been observed to be several quasi-stable configurations for tablets to flow along the tray floor.

In order to sort and stabilize, i.e., derandomize and orient into the desired single stable orientation, the tablets which flow in various quasi-stable flow configurations, the sorting region is comprised of a plurality of wedge-like members 30 (sixteen illustrated, one for each channel). Each of these wedge-like members possess five separate functional surfaces, which are shown in greater detail in the enlarged illustrations of FIGS. 3A and 3B.

Figure 3A:
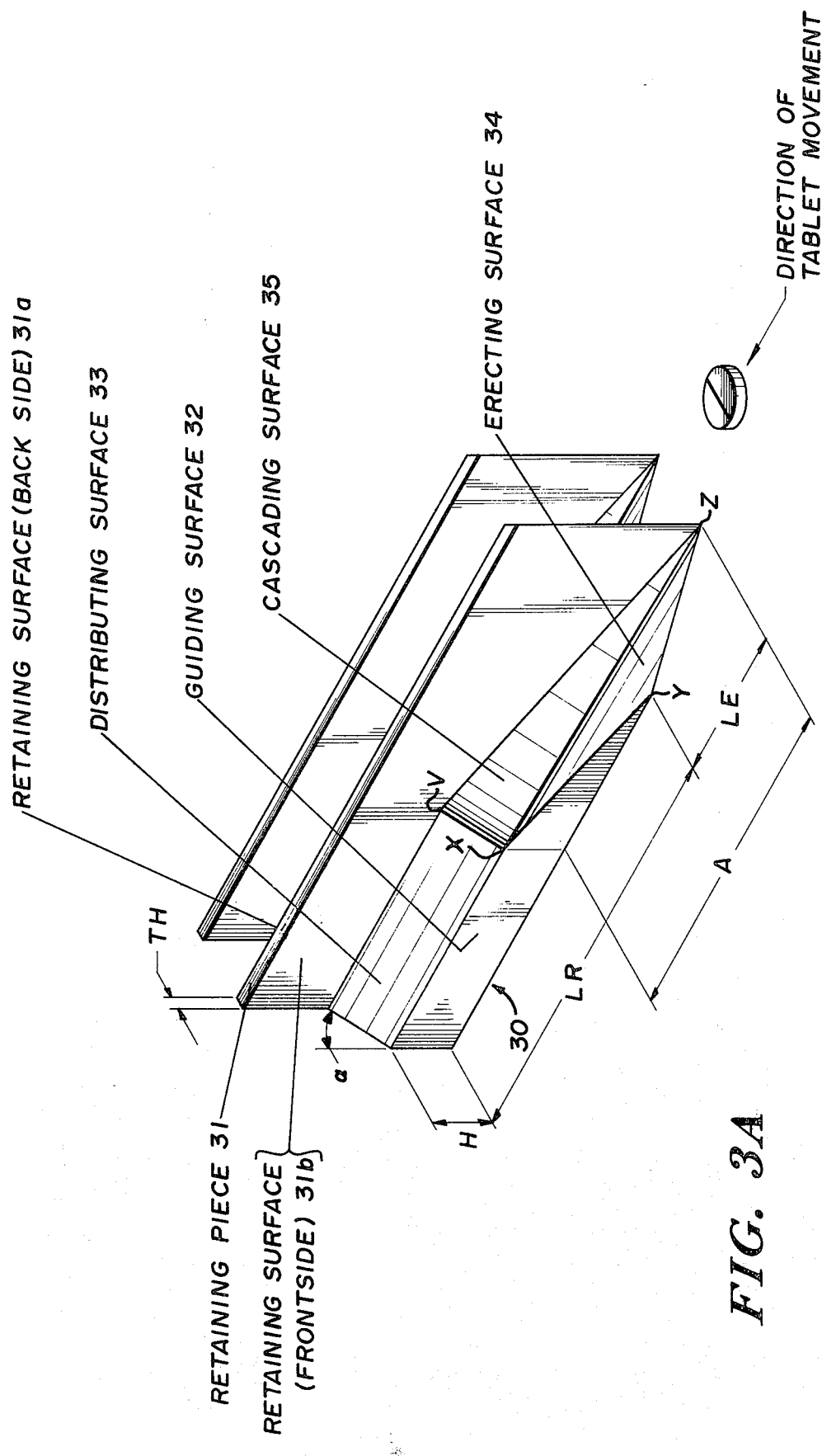
FIGS. 3A and 3B are enlarged perspective and end-on diagrammatic views respectively of a portion of the sorting region of the feeding tray depicted in FIG. 2 according to the invention illustrated in relation to the movement and orientation of objects such as tablets.

One of these surfaces, i.e., the retaining surface, is provided by retaining piece 31 which may be considered as being a vertical extension of the backside portion of the wedge-like member 30. However, it is to be understood that retaining piece 31 may, rather than being unitary with wedge-like member 30, instead be separate from but abutting the member 30 along the entirety of its longitudinal dimension $LR + LE$ (FIG. 3A). By the arrangement depicted in FIGS. 2, 3A and 3B, two adjacent retaining pieces define a channel, wherein the associated wedge-like member 30 abuts the right side retaining piece (relative to the direction of intended tablet movement). This retaining surface may, therefore, conveniently be designated the occupied retaining surface of the channel whereas the other (left side) retaining surface may be designated the free retaining surface.

The end (left most) channel of the left side channel group has its free retaining surface provided by the left vertical side of the vibrating tray 20. Although not shown, the extreme right hand channel of the right side channel group may similarly have its occupied retaining surface provided by the right vertical side of the tray 20. Each of the retaining pieces 31, with the possible and illustrated exception of the retaining piece 31 associated with the extreme right hand channels of both the left and right side channel groups, are provided with a front edge configuration wherein this front edge forms an angle $\theta$ (FIG. 2) with the direction of intended tablet movement. This angle preferably is acute and equal to or less than 45° in order to facilitate entrance of the tablets into the channel at the tip of the associated wedge-like member 30. This angle is optimizable based on the L/D ratio of the tablets to be processed. It is also preferable that the angle $\theta$ be the same for each one of the plurality of retaining pieces 31 associated with the respective left side or right side channel groups. Moreover, while the common angle $\theta$ may be the same for both groups (as shown in FIG. 2), it is to be understood that while it is preferable for the front edge of each retaining piece to have its angle $\theta$ the same in terms of degrees, $\theta$ for each retaining piece of one channel group may be directed opposite to that of the other channel group.

Figure 3B:
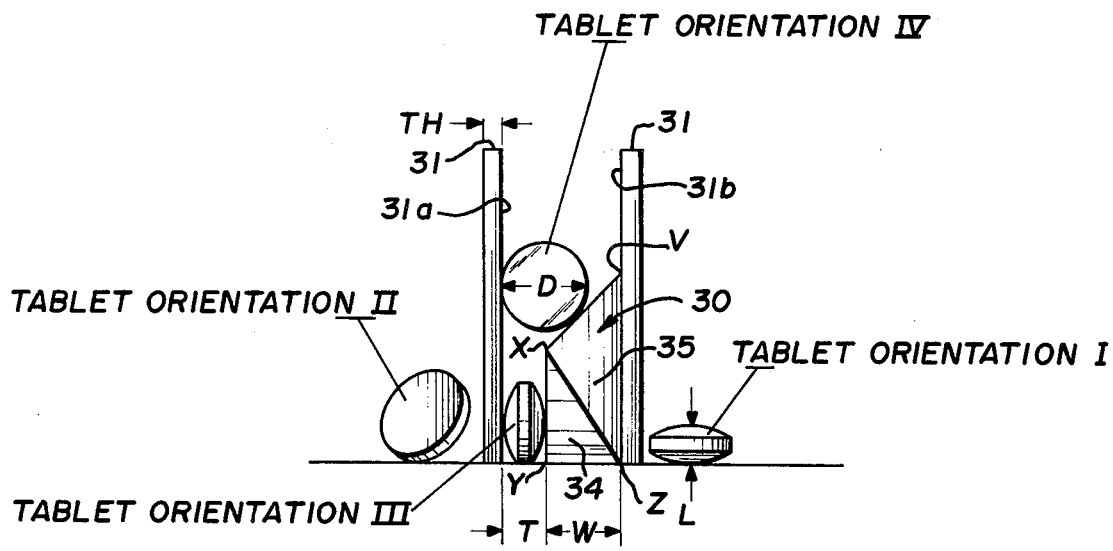

As may be best viewed in FIG. 3B, the width or horizontal cross-sectional dimension of a channel (i.e., the distance between the occupied 31b and free 31a retaining surfaces) is given as $T + W$, where $W$ is equal to the width or horizontal cross-sectional dimension of the wedge-like member 30 at its widest point, and $T$ is the width (horizontal transverse dimension) of a passageway formed between retaining surface 31a and guiding surface 32 of the member 30. This passageway extends for the length LR (FIG. 3A) to the end of the channel, terminating in the associated exit port 25.

It will be best noted from FIG. 2 that the width dimension of each of the exit ports 25 corresponds and is substantially equal to the width T of the passageway leading thereto. The exit ports are rectangular in shape with the length dimension (in the direction of intended table movement), being based, for example, on the diameter of the largest tablet reasonably expected to be processed by the arrangement according to the invention. Concentrating on the structure of just one of the channel arrangements, as particularly illustrated in FIGS. 3A and 3B, the wedge-like member 30 is designed with its four unique operating surfaces per channel (five if one considers the retaining surfaces as being part of a unitary extension of the rear portion of the member 30) to orient the tablets in such a way that each begins to roll along the length LR of the member 30 once the cylindrical surface thereof is in contact with the tray floor. That is, the tablets are caused to be oriented into the position required for movement down the passageway between the guiding surface 32 and the free retaining surface 31a and for passage through the associated exit port 25. This orientation is achieved, as aforesaid, regardless of the initial orientation of a tablet upon entering the sorting region.

The various surfaces of the wedge-like member perform a complex function to orient the tablets properly for any of the stable or quasi-stable flow configurations. These surfaces are identified (with particular reference to FIG. 3A) as being the erecting surface 34, the cascading surface 35, the distributing surface 33 and the guiding surface 32. Guiding surface 32 is a vertically oriented plane surface in the shape of a right or square trapezoid, which extends parallel to the free retaining surface 31a of the associated channel and in the direction of intended tablet movement to form the channel passageway leading to the associated exit port. The larger parallel edge of guiding surface 32 is its lower edge, in contact with the tray floor, which extends a predetermined length LR (which is based, for example, on the largest tablet size intended to be processed) from the extreme rear or lower end of the channel toward the front or upper end of the channel. The rear edge of guiding surface 32 is the edge of the right trapezoid perpendicular to the parallel edges and is contiguous with the rear side of the vibrating tray 20. The guiding surface 32 has a predetermined height H which is based also on the size of the largest tablets to be processed in particular the diameter D thereof. The front edge of trapezoidal-shaped guiding surface 32 defines an inclined slope in the direction of intended tablet movement, from the forwardmost point of the lower parallel edge of the guiding surface 32 on the floor of the tray 20 to the forwardmost point of the upper and shorter parallel edge at X. This inclined edge, therefore, forms an acute angle with the tray floor.

A second surface, i.e., the distributing surface 33, is situated above the guiding surface 32 and is arranged to have the plane thereof form an angle $\alpha$ with the guiding surface. This angle $\alpha$ is predeterminably selected, based particularly upon the curvature of the tablet convex surfaces, and preferably would be greater than or equal to 45°. Distributing surface 33 is a plane rectangular surface longitudinally extending in the direction of tablet movement, and having its lower edge common with and equal in length to the upper parallel edge of guiding surface 32. The upper edge of distributing surface 33 (running parallel to said common edge) is contiguous with the occupied retaining surface 31b, and the rear edge is contiguous with the rear side of the tray 20. The longitudinal dimension of distributing surface 33, i.e., the dimension of the edge common with guiding surface 32, is $(LR + LE) - A$.

A third surface of wedge-like member 31, i.e., the erecting surface 34, is a plane triangular surface, the plane of which forms a predetermined angle with the planes of the guiding and distributing surfaces as well as the floor of the tray 20. The one side of erecting surface XY is common with the inclined front edge of guiding surface 32. A second edge of the erecting surface 34 is contiguous with the floor of the tray 20 and runs from the forwardmost point Y of its common edge with guiding surface 32 to the forwardmost point Z of the wedge-like member 30 at a predetermined angle with the direction of intended tablet movement. The wedge-like member 30 comes to a point at this forwardmost point of extension Z, which point being situate on the tray floor is contiguous with the front edge of the occupied retaining surface 31b. The third side of the erecting surface 34 extends between points X and Z and defines an incline of lesser slope than the edge XY in the direction of intended tablet movement and at a predetermined angle therewith. The projected length of the edge YZ of erecting surface 34 in the direction of tablet movement along the tray floor is defined in FIG. 3A as LE, which dimension is also predetermined in dependence on tablet dimensions. The sum of LR and LE is equal to the entire length of a channel. A similar projection for the edge XZ of erecting surface 34 is identified in FIG. 3A as A.

The fourth surface of wedge-like member 30, i.e., the cascading surface 35, is also a plane triangle, one side of which, i.e., XZ, is common with the erecting surface 34. Cascading surface 35 is predeterminably arranged to have the plane thereof intersect each of the respective planes of the guiding, distributing and erecting surfaces, and which plane will pass through the floor of the tray at the point Z. More specifically, cascading surface 35 extends from point Z in an inclined manner to a rear edge XV thereof which is common with the vertically-running front edge of distributing surface 33. The side VZ of cascading surface is contiguous with the occupied retaining surface 31b.

The various operative surfaces of wedge-like member 30 are predeterminably arranged and oriented relative to each other and dimensioned as well in large part based upon consideration of the L/D parameter of the objects to be processed. The functions of the various operative surfaces of the wedge-like members 30 are as follows. For tablets lying flat on the tray floor as they reach the sorting region, i.e., tablet orientation I in FIG. 3B, the erecting surface 34 (FIG. 3A) acts to lift the edge of the tablet in contact with it, the other edge of the tablet being in contact with the free retaining surface 31a. After having moved along the channel approximately the length LE, those tablets having the sorting region in orientation I are turned erect as they pass along the erecting surface 34 in conjunction with the supportive function provided by free retaining surface 31a. Once in the erect orientation, i.e., the predetermined desired orientation III in FIG. 3B, the tablets begin to roll between the guiding (32) and free retaining (31b) surfaces for approximately the distance LR.

Tablets which enter the sorting region on edge, i.e., erect, but are sliding along their cylindrical axis, as illustrated by tablet orientation II, will be turned to orientation I also by the erecting surface 34.

If tablets of either of these two initial orientations, i.e., I and II, are riding or resting on other tablets or other layers of tablets they will most likely encounter the higher positioned cascading surface 35 initially. The cascading surface causes such tablets above the lowest layer to turn, as the one curved edge comes into contact with the free retaining surface 31a and the other edge contacts the cascading surface 35. With high probability, these tablets complete their turning motion prior to reaching the distributing surface 33, i.e., by the time they have traveled the distance A, unless there are several layers of tablets beneath them. Provided they complete their turning motion prior to reaching the distributing surface 33, these tablets will fall into the line of rolling tablets, under gravitational influence as well as the vibration of the tray, and proceed down the passageway between the free retaining (31a) and guiding (32) surfaces, where they are guided and kept in the desired erect rolling orientation III to the exit port and through the floor of the tray.

A tablet failing to be turned completely by the cascading surface 35, under certain conditions as to its flow behavior, can achieve the quasi-stable position IV shown in FIG. 3B, provided there are sufficient tablets behind it along the distributing surface 33. Any tablet partially turned in this region between the free retaining (31a) and distributing (33) surfaces will complete the motion to orientation III as a direct result of the force of gravity and the pitch of the distributing surface. Any tablet that momentarily remains in orientation IV is, however, prevented from blocking the free flow of correctly oriented tablets along the passageway between the guiding (32) and free retaining (31a) surfaces by virtue of the height II and angle $\alpha$ (FIG. 3A). Of course, such tablets will not remain in orientation IV indefinitely due to the induced oscillatory motion of the tray 20.

The length LE is three to four times the tablet diameter D of the largest tablets that are contemplated for processing by the arrangement according to the invention. The length LR is a minimum of five tablet diameters and may be longer, depending upon the required or desired feed rate. As mentioned, the height H and angle $\alpha$ depicted in FIG. 3A are fixed in such a way as to ensure the prevention of a blocking condition of the passageway, and are based primarily on the largest dimension (i.e., the diameter D) of the largest size tablets to be processed. The angle $\alpha$, moreover, is such as to ensure that jamming of two tablets cannot occur. This has been found not to be critical, however.

It has been found that the length A (FIG. 3A) should be at least five tablet diameters (D), but in the case where the coefficient of sliding friction between the tablet and wedge (30) surfaces is high, the dimension A may need to be as high as 10 tablet diameters. The width T of each of the passageways and the exit ports associated therewith should be at least $1.05 \times L$, where $L$ is the height or thickness of the tablet as shown in FIG. 3b. The dimension W (FIG. 3B) is fixed by the relationship $T + W > 1.5 \times D$. Of course, with the dimensions for H, LR, LE, T, W, A and the angle $\alpha$ being established, the other dimensions for the wedge-like members 30 are defined.

For any and all channels, the width T of the exit port and also the passageway between the free retaining surface 31a and the guiding surface 32 may be varied (i.e., decreased), by correspondingly varying (i.e., increasing) the thickness TH of the respective retaining pieces 31. This may be accomplished by adding to each free retaining surface a spacer (not particularly shown) of predetermined thickness. It is, of course, preferable that the added spacers be of the same thickness for each channel. Such spacers would, for example, be rectangularly shaped plates having substantially the same peripheral dimensions as the associated free retaining surface 31a. In adding the spacers to a channel, one of its broad surfaces would be completely contiguous with the free retaining surface 31a, and it could be demountably secured in place by way of any suitable clipping or clamping means operating on the existing retaining piece.

Alternatively, such spacers can be provided by mounting the same to the underside of a cover (not particularly shown) for the tray 20. Such a cover will normally serve to control tablet bounce and dust. In this manner, the spacers can be demountably or permanently affixed to the underside of the cover in uniform spaced arrangement such that with the cover in proper position each spacer becomes situated in close parallel contact with the retaining surface of the associated channel, just as would the spacer being clipped onto said retaining piece. For the various different size ranges of tablets there can be provided for one cover an individual set of demountable spacers of corresponding thickness. Alternatively a series of covers can be provided for the tray, each having fixedly mounted thereto in uniform parallel spaced array a set of spacers of unique thickness corresponding to a particular range of tablet sizes. In any of the above spacer adaptations it is, of course, contemplated that the original dimension T of the passageways and exit ports be based on the largest size of tablets intended to be processed. Thus, as to smaller sized tablets it becomes a simple task to modify T for each channel by way of a set of spacers having the appropriate thickness.

It is also to be considered within the scope of this invention that the length of the exit ports as well as the width T can be varied for different sized batches of tablets by the same spacer provisions as provided above. In this case, however, the spacers would be provided with an L-shaped end proximate the exit port for providing via the base of the L-shaped spacer a means extending perpendicular to the direction of intended tablet flow which would decrease the length dimension of the associated exit port by a predetermined amount in accordance with the size of the tablets contemplated for such spacers. Thus, with a single spacer element both the length and width dimensions of the exit port are decreasably varied, while at the same time preserving the geometrical shape of the exit port.

Figure 4:
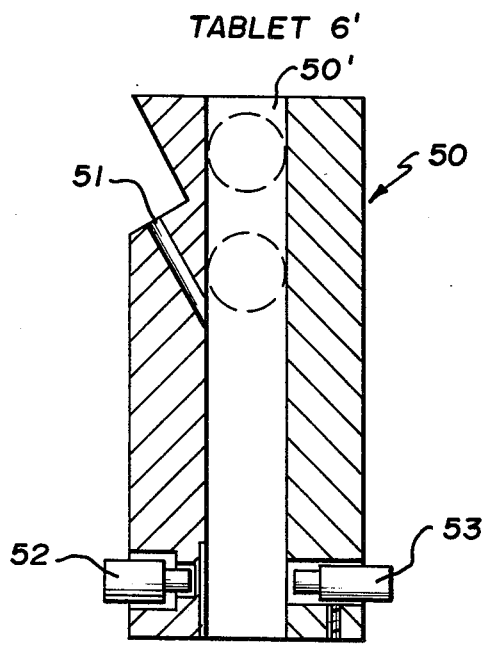
FIG. 4 is an enlarged schematic representation depicting the operation of one channel of an object sensing assembly designed to interface with the feeder tray.

In considering possible variations in the sensing or sampling head 5 that may be needed for processing tablets as opposed to capsules, for example, attention is called to FIG. 4, wherein there is depicted in schematic form a cross-sectional view of a preferred version of one of the plurality of sensing channel arrangements comprising the sampling head 5. In FIG. 4, there is provided a sensing channel arrangement 50 having a channel or passageway 50' arranged vertically to take full advantage of gravitational forces acting on the tablets exiting the feeder tray. The intake orifice of channel 50' is arranged immediately below an associated one of the exit ports 25 of the vibrating tray 20. As the tablets handled by each channel of the sorting region are forced to exit from the tray in single file, these tablets proceed through the sensing channel 50' likewise. However, at the high speeds contemplated herein adjacent tablets may become so close as to make it difficult for individual signature pulses to be generated. To avoid the possibility of tablets moving through the sensing head 5 undetected (i.e., too close together), pneumatic means in the form on an air jet 51 is provided. The air jet communicates with the channel 50' at an acute angle of predetermined appropriate dimension, which angled jet of air (continuous air stream) causes a tablet passing by to be accelerated downward toward sensing means 52, 53, thus causing sufficient separation between it and the following tablet. There also results from such an arrangement a small back flow of air from the first tablet that would tend to provide some additional separation between adjacent tablets by momentarily retarding in limited degree the forward progress of the second tablet.

Situated down the channel 50' a predetermined distance from the air jet opening into the channel there is arranged the sensing means 52, 53. In the illustrated embodiment, detection is by means of an optical arrangement comprising a suitable light emitting source 52 positioned off to one side of the channel in a cavity communicating with the channel and a suitable light sensitive device 53 positioned in a similar cavity arranged off to the opposite side of the channel. Thus, when a tablet proceeds past this optical arrangement the otherwise continuously received light beam is interrupted, causing in response thereto a counting pulse to be generated.

Flow distributor 24 can be made multifunctional by including proximate the forward tip thereof means for detecting severe jam-ups in the feeder tray at the entrance to the sorting region. For example, an electrooptic arrangement can be employed wherein a light-emitting element may be arranged in a tubular hollow area extending through the flow distributor 24 from side to side and thereby providing a beam of light to be generated across the path of tablet flow for both the left and right halves of the feeder tray. Arranged opposite thereto in the respective left and right sides of the tray can be a pair of light sensing means. The operative height of the detection arrangement above the tray floor preferably would be greater than two layers of tablets. Because of the fact that some tablets might still be in a bouncing mode by the time they pass the detection beam in nearing the sorting region, it is contemplated that the detection means would be provided with a delay threshold means whereby temporary or occasional interruption of the light beam would have no effect, and an alarm or shutdown condition would only be generated by the detection means if there resulted a continuous interruption of the light beam on either side of the tray for a specified threshold period.

While the principles of this invention have been described above in connection with specific apparatus, it is to be understood that this description is made by way of example and not as a limitation on the scope of the invention as set forth in the objects and features thereof or in the accompanying claims.

What is claimed is:

1. Apparatus for feeding at high speed, random flowing discreet solid particular objects such as tablets to a high-speed sensing and counting arrangement under the influence of gravity comprising an inclined vibrating feeder tray having an object receiving and spreading region and an object orienting region, said orienting region being provided with a plurality of spaced means for defining N substantially parallel channels arranged in the direction of intended object movement, each of said channels having at the remote end thereof an exit port for permitting the objects to pass in single file from said tray to the sensing and counting arrangement and each of said channels having associated therewith a single directing means comprised of a multi-surfaced wedge-like member having a plurality of unique orienting surfaces, each of said surfaces of said wedge-like member being predeterminably uniquely inclined relative to the floor of said tray for acting on respective different orientations of the objects and thereby enabling the objects to obtain said predetermined orientation in the associated channel regardless of the orientation thereof when encountering said wedge-like member, such that the objects when entering the channel will become disposed to pass through said exit port.

2. The arrangement according to claim 1 wherein said objects are tablets of substantially cylindrical shape and said exit ports are rectangularly shaped in correspondence to the cylindrical shape of the tablets such that said predetermined orientation necessary for passage of a tablet through an exit port comprises said tablet being in a posture of being erect and rolling on its cylindrical surface.

3. The arrangement according to claim 1 including flow distributor means for dividing said N channels into a left side channel group and a right side channel group.

4. The arrangement according to claim 1 wherein said wedge-like member is arranged longitudinally along the side of the associated channel.

5. The arrangement according to claim 1 wherein said member is comprised of at least four different operative surfaces providing said unique orienting influences.

6. The arrangement according to claim 1 wherein said channels are each defined by a vertical retaining surface extending in the direction of intended object movement on either side of the channels.

7. The arrangement according to claim 6 wherein each said wedge-like member has a rear portion and is abutting via said rear portion thereof one of said retaining surfaces defining the associated channel, which said abutted retaining surface is designated as the occupied retaining surface.

8. The arrangement according to claim 7 wherein said occupied retaining surface is the front side of a retaining piece and the back side of said retaining piece constitutes one of the retaining surfaces of an adjacent channel.

9. The arrangement according to claim 8 wherein each retaining piece situate between two channels is provided with a predetermined thickness TH which is dependent on the size of the objects to be sensed.

10. The arrangement according to claim 9 wherein the front edge of each of said retaining pieces is arranged to form an acute angle $\theta$ with the direction of intended object movement.

11. The arrangement according to claim 10 wherein said angle $\theta < 90°$, and wherein said arrangement further includes flow distributor means for dividing said plurality of channels into a left side group and a right side group, and the angle $\theta$ of each retaining piece associated with one of said left side or right side channel groups is the same.

12. The arrangement according to claim 11 wherein said front edge angle $\theta$ is the same for both left and right side channel groups and $\theta \leq 45°$ so as to prevent a pile up of objects at the front portion of the channels.

13. The arrangement according to claim 9 further including means for varying said dimension TH.

14. The arrangement according to claim 13 wherein in each channel a passageway to the associated exit port is defined by one of said retaining surfaces and a surface of said wedge-like member which faces said one retaining surface and is parallel thereto, said passageway and associated exit port each having a width dimension T which is predeterminably dependent on the size of the objects and which is variable inversely relative to the variation to the dimension TH of the associated retaining surface.

15. The arrangement according to claim 7 wherein each said wedge-like member abuts the corresponding same one of the pair of retaining surfaces defining the associated channel thereof.

16. The arrangement according to claim 7 wherein said retaining surface is a unitary portion of said wedge-like member and comprises a vertical extension of said rear portion thereof.

17. The arrangement according to claim 16 wherein the back side of said vertical extension constitutes one of the retaining surfaces of an adjacent channel.

18. The arrangement according to claim 7 wherein each said wedge-like member extends the entire length of the abutting retaining surface.

19. The arrangement according to claim 7 wherein said wedge-like member is comprised of at least four separate operative surfaces providing said unique orienting influences on the objects, and wherein a first one of said surfaces is a guiding surface extending parallel to and spaced apart from the other one of said retaining surfaces defining the associated channel, which other retaining surface is designated as the free retaining surface.

20. The arrangement according to claim 19 wherein said guiding surface and said free retaining surface define an elongated passageway extending in the direction of intended object movement.

21. The arrangement according to claim 20 wherein said passageway has a predetermined horizonal cross-sectional dimension T which is dependent on the size of the objects to be sensed.

22. The arrangement according to claim 21 wherein the objects are substantially cylindrical in shape having an axial dimension L, and wherein said wedge-like member has a maximum horizontal cross-sectional dimension of W, with W being defined by the relationship $T + W > 1.5 L$, where $T \geq 1.05 \times L$.

23. The arrangement according to claim 22 wherein the horizontal cross-sectional dimension of each channel between the associated retaining surfaces is equal to $T + W$.

24. The arrangement according to claim 21 wherein each said exit port is shaped to permit passage of the objects therethrough only in said predetermined orientation and has a first dimension substantially equal to the dimension T of the associated passageway.

25. The arrangement according to claim 20 wherein the objects are substantially cylindrical in shape having a cross-sectional dimension D and a central longitudinal dimension L with an L/D ratio less than 1, and wherein the dimension T is defined by the relationship $T \geq 1.05 \times L$.

26. The arrangement according to claim 20 wherein the orientations of said guiding surface and said free retaining surface together define a structure enabling only those objects having said predetermined orientation to proceed along said passageway to said exit port.

27. The arrangement according to claim 20 wherein the orientations of said guiding surface and said free retaining surface together define a structure preventing objects having other than said predetermined orientation from blocking said passageway to the flow of objects having said predetermined orientation.

28. The arrangement according to claim 27 wherein the height H of said guiding surface is greater than the largest dimension of the objects, for enabling said guiding surface in its spaced relationship with said free retaining surface to avoid a blockage of the associated passageway.

29. The arrangement according to claim 19 wherein said guiding surface is vertically oriented and trapezoidal in shape with the larger parallel edge thereof constituting the bottom edge.

30. The arrangement according to claim 29 wherein the dimension of said bottom edge is LR, where LR is greater than five times the largest dimension of the objects to be sensed.

31. The arrangement according to claim 29 wherein said guiding surface is a right trapezoid having the rear edge thereof perpendicular to the parallel edges of said surface, said rear edge having a dimension H, where H is greater than the largest dimension of the objects.

32. The arrangement according to claim 19 wherein said guiding surface has the shape of a right trapezoid and wherein a second one of said surfaces is a distributing surface having a rectangular shape and being arranged above said guiding surface, the plane of said distributing surface forming with the plane of said guiding surface a predetermined acute angle $\alpha$.

33. The arrangement according to claim 32 wherein $\alpha \geq 45°$ and said distributing surface has one of its long edges in common with the upper parallel edge of said guiding surface.

34. The arrangement according to claim 33 wherein said objects are cylindrical in shape with an axial dimension to diameter dimension rato (L/D) of less than 1, and wherein $\alpha$ is dependent on the curvature of the object convex surfaces.

35. The arrangement according to claim 32 wherein said distributing surface is disposed in operative spaced relationship with the associated free retaining surface for orienting into said predetermined orientation those objects which have reached the rearward half of the associated channel in other than said predetermined orientation and for directing these objects to assume a position between said free retaining surface and the associated guiding surface.

36. The arrangement according to claim 32 wherein a third one of said surfaces is an erecting surface having a triangular shape and being disposed in front of and contiguous with said guiding surface, the plane of said erecting surface forming on angle with the respective planes of said guiding surface, said distributing surface and the bottom of said tray.

37. The arrangement according to claim 36 wherein said wedge-like member tapers to a point Z at the forwardmost end thereof relative to the direction of intended object movement, which point Z abuts said occupied retaining surface at the lowermost portion of the front edge thereof.

38. The arrangement according to claim 37 wherein said erecting surface inclines from the floor of said tray at point Z to the forwardmost point of intersection X of the plane of said distributing surface with the plane of said guiding surface.

39. The arrangement according to claim 38 wherein the forwardmost point of said guiding surface is a point Y located on the floor of said tray and wherein the side of said erecting surface which is common with said guiding surface is XY, with the other two sides of said erecting surface being XZ and YZ.

40. The arrangement according to claim 36 wherein said objects are cylindrical in shape and further defined by an L/D ratio of less than 1 and wherein said erecting surface is arranged in the forward portion of the associated channel relative to the direction of intended object movement to influence said objects incoming to the channel which are lying flat on the floor of said tray into said predetermined orientation.

41. The arrangement according to claim 40 wherein said erecting surface is disposed in spaced relationship with said free retaining surface at a predetermined angle with the latter influencing said objects from a sliding orientation along their respective axes into said predetermined orientation.

42. The arrangement according to claim 40 wherein said erecting surface is disposed in spaced relationship with said free retaining surface at a predetermined angle with the latter for causing objects sliding along lying flat on their side and objects sliding along on edge substantially along their cylindrical axes to be oriented into said predetermined orientation of rolling on its edge within a distance LE, which distance extends from the forwardmost point of said wedge-like member to the forwardmost point of said guiding surface relative to the direction of intended object movement.

43. The arrangement according to claim 42 wherein the total length of a channel is LR + LE, where LR is the length of the longer parallel edge of said guiding surface extending in the direction of intended object movement from a point common to said erecting surface and the floor of said tray to the end of the channel.

44. The arrangement according to claim 43 wherein the length of said distributing surface along the direction of intended object movement is $(LR+LE)-A$, where A represents the distance, taken in the direction of intended object movement, between the beginning of the channel and the point of intersection of said erecting, guiding and distributing surfaces.

45. The arrangement according to claim 44 wherein A is greater than five times the diameter D of said objects.

46. The arrangement according to claim 36 wherein the fourth one of said surfaces is a cascading surface having a triangular shape and being arranged above said erecting surface and situate in front of said distributing surface, said cascading surface being so disposed as to have the plane thereof form an angle with each of the respective planes of said guiding, distributing and erecting surfaces and with the floor of said tray.

47. The arrangement according to claim 46 wherein said cascading surface extends from the forwardmost point Z of said wedge-like member to be contiguous with said distributing surface at a common edge XV, which edge XV extends perpendicular to the direction of intended object movement.

48. The arrangement according to claim 46 wherein said objects are substantially cylindrical in shape having an L/D dimension ratio of less than 1 and wherein said cascading surface is disposed in spaced relationship with said free orienting surface at a predetermined angle with the latter to orient objects initially riding on one or more other layers of said objects into said predetermined orientation prior to the same reaching the front edge of said distributing surface and/or guiding surface.

49. The arrangement according to claim 6 wherein said retaining surfaces for each channel extend from the beginning of the channel to the end of the channel and wherein the associated exit port is arranged at the extreme lower end of said inclined tray at the end and in the bottom of said channel so as to enable the exiting objects to fall through the floor of said tray.

50. The arrangement according to claim 49 wherein the length of said retaining surfaces is $LE + LR$ and wherein $LE$ is three to four times the largest dimension of the objects to be sensed and LR is greater than five times said largest dimension.

51. The arrangement according to claim 50 wherein the objects are substantially cylindrical in shape with the largest dimension being the cross-sectional diameter, and the L (axial dimension) to D (diameter) ratio is less than 1.

52. The arrangement according to claim 6 wherein one of the retaining surfaces associated with each of the end channels of said orienting region is provided by a side wall of said tray.

53. The arrangement according to claim 1 wherein said receiving and spreading region is situate at the upper portion of said inclined tray and said orienting region is situate at the lower portion of said tray, and wherein said tray is at the inclined angle $\beta$ with respect to the horizontal, the angle $\beta$ having a range of 4° to 15°.

54. The arrangement to claim 1 wherein said receiving and spreading region is situate at the upper portion of said inclined tray and said orienting region is situate at the lower portion of said tray, and wherein said tray is caused to vibrate via a vibratory driver arrangement.

55. The arrangement according to claim 54 wherein said tray vibrates in the range of 30–60 Hz.

56. The arrangement according to claim 1 further including means for varying the horizontal cross-sectional dimension of each channel in predetermined dependence upon the size of the objects.

57. The arrangement according to claim 56 wherein each channel is defined by vertically arranged retaining walls extending in the direction of intended object movement on either side of the channel, and wherein said means for varying the channel horizontal cross-sectional dimension includes means for varying the thickness dimension of one of said retaining walls.

58. The arrangement according to claim 57 wherein said means for varying the thickness dimension of said one retaining wall includes a spacer positioned within said channel to abut said retaining wall, thereby correspondingly narrowing said cross-sectional dimension of said channel.

59. The arrangement according to claim 58 wherein said spacer is clipped unto said one retaining wall.

60. The arrangement according to claim 58 wherein said tray is provided with a cover and said cover has mounted thereto in predetermined spaced array on the under side thereof a plurality of said spacers.

61. The arrangement according to claim 60 wherein said tray is provided with a plurality of covers each having an array of spacers having a unique thickness dimension to correspond to a predetermine range of sizes of the objects to be sensed.

* * * * *